(No Model.)
W. R. FEARN.
POCKET LAMP.
No. 491,963. Patented Feb. 14, 1893.
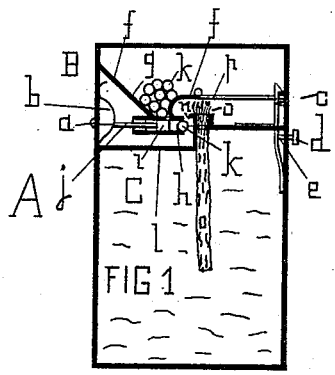
FIG 1
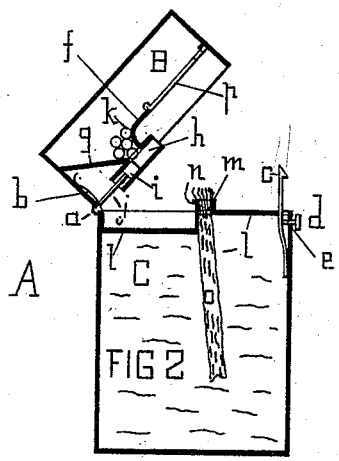
FIG 2
FIG 3
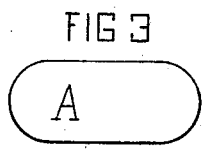
WITNESSES
INVENTOR
William R. Fearn
by Francis D. Pastorius
Solicitor

UNITED STATES PATENT OFFICE.

WILLIAM R. FEARN, OF CAMDEN, NEW JERSEY, ASSIGNOR OF ONE-HALF TO DAVID JONES, OF SAME PLACE.

POCKET-LAMP.

SPECIFICATION forming part of Letters Patent No. 491,963, dated February 14, 1893.

Application filed June 19, 1891. Serial No. 396,851. (No model.)

*To all whom it may concern:*

Be it known that I, WILLIAM R. FEARN, a citizen of the United States, residing at Camden, in the county of Camden and State of New Jersey, have invented a new and useful Pocket-Lamp, of which the following is a specification.

My invention consists in a hinged-case pocket-lamp. The lid and body are both divided into upper and lower apartments. Those of the former are for cartridge supplying purposes, and the latter contain the wick-tube, cartridge-cylinder space and illuminant.

On reference to the accompanying sheet of drawings making part of this specification: Figure 1 is a longitudinal and vertical section of my pocket-lamp, the lid being closed; Fig. 2 is the same view as Fig. 1, with the exception of the lid being open; and Fig. 3 is a top view of the case.

Similar letters refer to similar parts in the several views.

A is a case of any required shape, and, B, its lid hinged to the body, C, at, $a$, to suddenly fly open by the reaction of a spring, $b$, fixed to the body, its loose end bearing against the lid. It is held closed by a spring-catch, $c$, riveted to the body, and extended upwardly for engaging with any suitable projection of the lid, said catch is operated for opening the lid, by a pressure-knob, $d$, and a stem, $e$, passing through the case.

The lid, B, is divided into two parts by an irregular partition, $f$, the part, $g$, of which constitutes a hopper for supplying fulminate cartridges to a cartridge-cylinder, $h$, fixed at the end of the hopper, in the bottom apartment of the lid. There is a communication between the hopper, $g$, and the interior of the cylinder, $h$, which is closed by its piston, $i$, where it is horizontal by reason of the closing of the lid, B, and the consequent contact of the end of the piston-rod, $j$, with the spring, $b$, in its curved and operative condition, as shown in Fig. 1, which forces it over the communicating opening. As will be seen on referring to Fig. 1, the center or axis of the cartridge-cylinder, $h$, is below the scratcher, $n$, when the cylinder is horizontal, therefore the spring is not fully curved and operative, and does not act on the piston-rod, $j$, with its full force and effect, until the lid is closed and the cylinder horizontal. The intention in placing the cylinder below the scratcher, $n$, is for preventing the spring acting on the piston-rod and piston, from projecting a cartridge out of the cylinder until it has assumed its horizontality, on the closing of the lid, and all possibility of said cartridge contacting with the scratcher avoided. The closing of the lid cannot contact a cartridge with the scratcher, because the said cartridge does not project out of the cylinder until it is passed. To prevent a cartridge from falling back out of the path of the scratcher when the lid is raised, the end of the cylinder can be reduced so as to squeeze said cartridge into and project out of it, where it will remain until exploded by contacting with said scratcher.

The body, C, of the case, is divided into two apartments by a partition, $l$, consisting of two horizontal and a connecting vertical part by which there is sufficient space in the upper apartment for the swing of the cartridge-cylinder, $h$, when opening and closing the lid, and the end of the wick, $o$, is brought sufficiently near the lid partition, $f$, to have its flame extinguished by the closing lid. The bottom apartment contains cotton or waste saturated with any illuminant, which is taken up by the wick.

The operation of my invention is as follows: On pressing the knob, $d$, the stem, $e$, forces the spring-latch, $c$, from its contact with the lid. The re-action of the spring, $b$, forcibly throws the lid open, by which the cartridge, $k$, projecting from the end of the cylinder, strikes against the scratcher, $n$, of the wick-tube, $m$, and explodes. Its flame is at once communicated to the wick, $o$, enough for the temporary purposes of a pocket-lamp.

When the cartridges need renewing, the renewal is effected through a hinged-door, $p$, in the irregular partition, $f$, of the lid. The saturated cotton or waste can be filled in the bottom apartment, C, of the case, by means of a tight, removable-cap.

I claim—

In a pocket-lamp, the combination with a case, A, of a lid, B, divided by a partition, $f$; a cartridge-hopper, $g$, formed in said partition; a cartridge-cylinder, $h$, fitted to the bottom of said hopper and in communication therewith; a piston, $i$, and piston-rod, $j$, and a curved lid-opening spring, $b$, the spring, piston, and rod being operated by the lid; and a scratcher on the case, substantially as described.

In testimony whereof I affix my signature in presence of two witnesses.

WILLIAM R. FEARN.

Witnesses:
FRANCIS D. PASTORIUS,
MARTIN V. BERGEN.